(12) United States Patent
Lv et al.

(10) Patent No.: US 10,093,128 B2
(45) Date of Patent: Oct. 9, 2018

(54) WHEEL HUB UNIT (71) Applicant: SHANDONG HAOXIN MACHINERY CO., LTD., Changyi, Shandong (CN)

(72) Inventors: Jixian Lv, Changyi (CN); Guangming Pu, Changyi (CN)

(73) Assignee: Shandong Haoxin Machinery Co., Ltd., Shandong (CN)

( * ) Notice: Subject to any disclaimer, the term of this patent is extended or adjusted under 35 U.S.C. 154(b) by 113 days.

(21) Appl. No.: 15/303,513

(22) PCT Filed: Mar. 20, 2015

(86) PCT No.: PCT/CN2015/074653
§ 371 (c)(1),
(2) Date: Oct. 11, 2016

(87) PCT Pub. No.: WO2015/154618
PCT Pub. Date: Oct. 15, 2015

(65) Prior Publication Data
US 2017/0028777 A1 Feb. 2, 2017

(30) Foreign Application Priority Data

Apr. 12, 2014 (CN) .......................... 2014 1 0149431
Aug. 20, 2014 (CN) .......................... 2014 1 0413043

(51) Int. Cl.
*B60B 27/00* (2006.01)
*F16C 19/28* (2006.01)
(Continued)

(52) U.S. Cl.
CPC ........ *B60B 27/001* (2013.01); *B60B 27/0057* (2013.01); *B60B 27/0078* (2013.01);
(Continued)

(58) Field of Classification Search
CPC ... B60B 27/001; B60B 27/0073; B60B 27/02; B60B 27/06; B60B 27/0057; F16C 19/28; F16C 33/366; F16C 19/38; F16C 35/073
(Continued)

(56) References Cited

U.S. PATENT DOCUMENTS 1,748,131 A * 2/1930 Johnson ................. B61D 11/00
384/459
2,914,364 A * 11/1959 Ross ................... B60B 33/0028
16/36
(Continued)

FOREIGN PATENT DOCUMENTS

CN 203756762 U * 8/2014
CN 104175800 A 12/2014
(Continued)

OTHER PUBLICATIONS

International Search Report for PCT/CN15/74653 dated Jun. 23, 2015; 8 pages.
(Continued)

*Primary Examiner* — S. Joseph Morano
*Assistant Examiner* — Jean W Charleston
(74) *Attorney, Agent, or Firm* — Loza & Loza, LLP; Michael Fedrick (57) ABSTRACT

A wheel hub unit comprises a wheel hub body (100, 200), a first tapered roller bearing (101, 201) and a second tapered roller bearing (102, 202). Two bearings are oppositely disposed in the wheel hub body (100, 200). A bearing bush (104) or a shaft sleeve (204) is sleeved in the inner rings of the first tapered roller bearing (101, 201) and that of the second tapered roller bearing (102, 202), so as to form a rolling and sliding bearing, and the high strength load is effectively absorbed. A seal element is disposed between the outside end of the bearing and the wheel hub body (100,
(Continued)

200) to form the integral type independent seal. The problem that the inner rings of the bearings are exchanged and assembled in a mixed way during the assembly process is avoided, and the efficiency and accuracy of assembly are improved.

9 Claims, 5 Drawing Sheets

(51) Int. Cl.
  *F16C 33/36* (2006.01)
  *F16C 33/66* (2006.01)
  *F16C 33/76* (2006.01)
  *F16C 35/067* (2006.01)
  *F16C 19/54* (2006.01)
  *F16C 33/72* (2006.01)
  *F16C 17/10* (2006.01)
  *F16C 21/00* (2006.01)
  *F16C 33/10* (2006.01)
  *B60B 27/02* (2006.01)
  *F16C 35/073* (2006.01)
  *F16C 19/36* (2006.01)
  *F16C 35/02* (2006.01)

(52) U.S. Cl.
  CPC .............. *F16C 17/10* (2013.01); *F16C 19/28* (2013.01); *F16C 19/548* (2013.01); *F16C 21/00* (2013.01); *F16C 33/1065* (2013.01); *F16C 33/366* (2013.01); *F16C 33/6659* (2013.01); *F16C 33/72* (2013.01); *F16C 33/76* (2013.01); *F16C 35/067* (2013.01); *B60B 27/0073* (2013.01); *B60B 27/02* (2013.01); *B60B 2380/14* (2013.01); *B60B 2380/73* (2013.01); *F16C 19/364* (2013.01); *F16C 35/02* (2013.01); *F16C 35/073* (2013.01); *F16C 2326/02* (2013.01)

(58) Field of Classification Search
  USPC ........... 301/105.1, 108.1; 384/489, 504, 505, 384/506, 510, 512, 517, 537, 543, 544, 384/559, 560
  See application file for complete search history.

(56) References Cited

U.S. PATENT DOCUMENTS

| | | | | |
|---|---|---|---|---|
| 4,203,635 | A | * | 5/1980 | Reiter ................. B60B 27/001 384/560 |
| 5,667,313 | A | * | 9/1997 | Kapaan ................ B60B 27/001 384/504 |
| 6,315,457 | B1 | * | 11/2001 | Kapaan ................ B60B 27/001 384/544 |
| 8,449,197 | B2 | * | 5/2013 | Kawamura ............ B60B 27/00 301/105.1 |
| 2004/0041462 | A1 | * | 3/2004 | Hicks ..................... B60B 37/10 301/105.1 |
| 2013/0313799 | A1 | * | 11/2013 | Ruedi ................... B60B 27/001 280/105 |

FOREIGN PATENT DOCUMENTS

| | | | | |
|---|---|---|---|---|
| CN | 103912587 B | | 9/2016 | |
| GB | 2112500 A | * | 7/1983 | ........... B60B 27/001 |

OTHER PUBLICATIONS

Written Opinion and English translation thereof for PCT/CN15/74653 dated Jun. 23, 2015; 10 pages.

* cited by examiner

WHEEL HUB UNIT

CROSS-REFERENCE TO RELATED APPLICATIONS

This application is the U.S. national stage of International Patent Application No. PCT/CN2015/074653, filed on Mar. 20, 2015 and entitled WHEEL HUB UNIT, which claims the benefit of priority under under 35 U.S.C. § 119 from the following patent applications:
1) Chinese Invention Patent Application No. CN201410149431.4, filed in the Chinese Patent Office on Apr. 12, 2014, and entitled "WHEEL END ASSEMBLY FOR COMMERCIAL VEHICLE"; and
2) Chinese Invention Patent Application No. CN201410413043.2, filed in the Chinese Patent Office on Aug. 20, 2014, and entitled "INTEGRAL WHEEL HUB".

TECHNICAL FIELD

The present invention relates to the technical field of vehicle wheel hubs, and particularly, to a wheel hub unit comprising a wheel hub body and a rolling bearing.

BACKGROUND

With the rapid development of highways and the automotive logistics industry in China, the quantity of commercial vehicles/passenger cars is becoming more and more. After a rolling bearing and a wheel hub body of a vehicle are assembled to an axle, a bearing outer ring rotates relative to a wheel axle, but a bearing inner ring cannot rotate relative to the wheel axle. The bearing inner ring is only stressed at a bottom portion (accounting for about ⅕ to ⅓ of the entire circumference), thereby suffering concentrated stress, and the wear degree of an outer ring in each work cycle, namely works for a circumference, only corresponds to the wear degree of the bottom portion of an inner ring, the service lives of the two components are "seriously unequal". A linear perimeter of the inner ring raceway of the rolling bearing is smaller than that of the outer ring raceway of the bearing, resulting in that the relative linear velocity of the bearing inner ring and a bearing rolling body is much higher than that of the bearing outer ring. When the vehicle is running smoothly, the bearing normally operates, and the rolling body is in a "capable of rolling" state; and when the vehicle is driving on an uneven road, a momentary "incapable of rolling" state of the rolling body will be generated, the rolling body slides in the inner ring raceway, generating a high temperature, "fatigue pitting" of the bearing inner ring starts, and agglutination and ablation of the inner ring raceway of the bearing will be produced after multiple continuous repeated processes, which finally results in the invalidity of the rolling bearing.

In addition, the wheel hub body and the rolling bearing and other parts of the wheel hub unit are provided by manufactures in the form of separated part, which are assembled together by the wheel hub unit supplier, so the assembly efficiency is low, and a problem that the bearing inner rings are exchanged and assembled in a mixed way is generated easily in an assembly process of the two rolling bearings, thereby influencing the assembly precision and the service life of the bearings. Furthermore, the bearing inner ring of the existing wheel hub unit is directly matched with the wheel axle, so the sealing property cannot be guaranteed, particularly: there is a leakage problem of the lubricating substances between the bearing outer ring and the wheel hub body and between the bearing inner ring and the wheel axle. Moreover, a stress generated by a spindle head nut used for adjusting a bearing clearance after pre-tightening directly and consistently acts on the bearing inner ring, resulting in the deformation of the raceway during use, and thus the service life of the rolling bearing is greatly shortened.

SUMMARY

To overcome the aforementioned defects in the wheel hub unit, the first technical problem to be solved in the present invention is to provide a wheel hub unit so as to prolong the service life of a rolling bearing thereof.

To solve the first technical problem, the technical solution of the present invention is provided as follows: a wheel hub unit for a commercial vehicle, comprising: a wheel hub body; a first tapered roller bearing and a second tapered roller bearing, wherein the first tapered roller bearing and the second tapered roller bearing are oppositely disposed in the wheel hub body, an oil seal seat is disposed on an end part of an outer side of the first tapered roller bearing, and an oil seal is disposed between the oil seal seat and the wheel hub body; and two bearing bushes, wherein inner rings of the first tapered roller bearing and the second tapered roller bearing are respectively sleeved on one bearing bush.

Wherein, an oil groove for storing oil is formed in an outer peripheral surface of the bearing bush.

With the aforementioned technical solution, the present invention has the following beneficial effects:
1) Since one bearing bush is respectively sleeved on the inner rings of the first tapered roller bearing and the second tapered roller bearing, a rolling with sliding bearing is actually formed, when in use, the bearing bushes are sleeved on a wheel axle, in the case of a sudden rise of the stress suffered by the tapered roller bearings and an "incapable of rolling" state between a rolling body and the bearing inner rings, the bearing inner rings slide, and the elastic deformation of the rolling body recovers to the same after the impact load disappears, and the rolling body recovers to a "capable of rolling" state, at the moment when the rolling body cannot roll, the problem that the rolling body slides in the bearing inner rings slide to generate a high temperature to cause "fatigue pitting" of the bearing inner rings is solved, and meanwhile, with the rotation, the stressed portion of the bearing inner rings alternately changes to avoid the damage resulting from the local stress of only ⅕ to ⅓ of the entire circumference and the stress concentration, therefore the service life of the rolling bearing is prolonged, and the bearing capacity of the wheel hub unit is improved.
2) The oil groove for storing oil is formed in the outer peripheral surface of the bearing bush to guarantee the lubrication performance between the bearing bush and the inner ring of the tapered roller bearing.

As the same technical concept, the second technical problem to be solved in the present invention is to provide an integral wheel hub unit, which can not only prolong the service life of the rolling bearing thereof, but can be integrally provided to the wheel hub unit supplier, the assembly precision is high, the sealing performance is good, and great convenience is brought to the wheel hub unit supplier.

To solve the aforementioned second technical problem, the technical solution of the present invention is provided as follows: an integral wheel hub unit, comprising: a wheel hub body; a first tapered roller bearing and a second tapered roller bearing, wherein the first tapered roller bearing and the second tapered roller bearing are oppositely disposed in the wheel hub body, a check ring is disposed on an end part of an outer side of the first tapered roller bearing, and a first seal element is disposed between the check ring and the wheel hub body; and a shaft sleeve, wherein the inner rings of the first tapered roller bearing and the second tapered roller bearing are sleeved on the shaft sleeve, an annular convex ring is disposed at one end of the shaft sleeve, a first seal element is disposed between the annular convex ring and the wheel hub body, and the check ring is sleeved on the other end of the shaft sleeve.

Wherein, a second seal element is disposed between an outer peripheral surface of the shaft sleeve and an inner peripheral surface of the check ring.

Wherein, the annular convex ring leans against the inner ring of the second tapered roller bearing, the check ring leans against the inner ring of the first tapered roller bearing, and an end face of the shaft sleeve located on one side of the check ring is flush with an installation end face on an outer side of the check ring.

With the aforementioned technical solution, the present invention has the following beneficial effects:

1) Similar to the technical solution for solving the first technical problem, since one shaft sleeve is respectively sleeved on the inner rings of the first tapered roller bearing and the second tapered roller bearing, a rolling and sliding bearing is actually formed, the shaft sleeve corresponds to the bearing bush, and both are slide bearings, and moreover, one shaft sleeve replaces two bearing bushes, so the assembly is higher in precision and is more convenient. The generated effects are the same, and will not be described herein.

2) Since one annular convex ring is disposed at one end of the shaft sleeve, the check ring is sleeved on the other end of the shaft sleeve, one first seal element is disposed between the annular convex ring and the wheel hub body, and one first seal element is disposed between the check ring and the wheel hub body, such a structure achieves independent seal and avoids the leakage of lubricating substances. Compared with the separated parts, the assemblies can be integrally provided to the wheel hub unit supplier, thereby avoiding the problem that the bearing inner rings are exchanged and assembled in a mixed way during assembling by the wheel hub unit supplier, improving both the assembly efficiency and the assembly precision, and bringing great convenience to the customers.

3) Since the second seal element is disposed between the outer peripheral surface of the shaft sleeve and the inner peripheral surface of the check ring, the sealing effect is further improved.

4) Since the annular convex ring leans against the inner ring of the second tapered roller bearing, and the check ring leans against the inner ring of the first tapered roller bearing, and the end face of the shaft sleeve located on one side of the check ring is flush with the installation end face on the outer side of the check ring, after a bearing clearance is adjusted according to the setting, an axial pre-tightening force provided by a spindle head nut is transferred to both ends of the shaft sleeve to avoid directly and consistently applying the axial pre-tightening force to the inner ring of the rolling bearing, thereby reducing the stress deformation of the raceway and prolonging the service life of the rolling bearing.

BRIEF DESCRIPTION OF THE DRAWINGS

FIG. 5 is a section view of a structure in a use state according to a second embodiment of the present invention; and wherein:

100—a wheel hub body, 101—a first tapered roller bearing, 101A—a bearing inner ring, 101B—a rolling body, 101C—a bearing outer ring, 102—a second tapered roller bearing, 103—a wheel axle, 104—a bearing bush, 1041—an oil groove, 105—an oil seal seat, 106—an oil seal, 107—a spindle head nut and 108—a bolt; 200—a wheel hub body, 201—a first tapered roller bearing, 202—a second tapered roller bearing, 203—a wheel axle, 204—a shaft sleeve, 2041—an annular convex ring, 2042—an oil duct, 205—a check ring, 2051—a groove, 206—a first seal element, 207—a spindle head nut, 208—a second seal element, and 209—a drum brake.

DETAILED DESCRIPTION OF EMBODIMENTS

In order that the objects, technical solutions and advantages of the present invention become more apparent, further description will illustrated below in detail, taken in conjunction with the accompanying drawings and embodiments. It should be understood that the specific embodiments described herein are merely exemplary in nature, and are in no way intended to limit the invention.

First Embodiment

Figure 1:
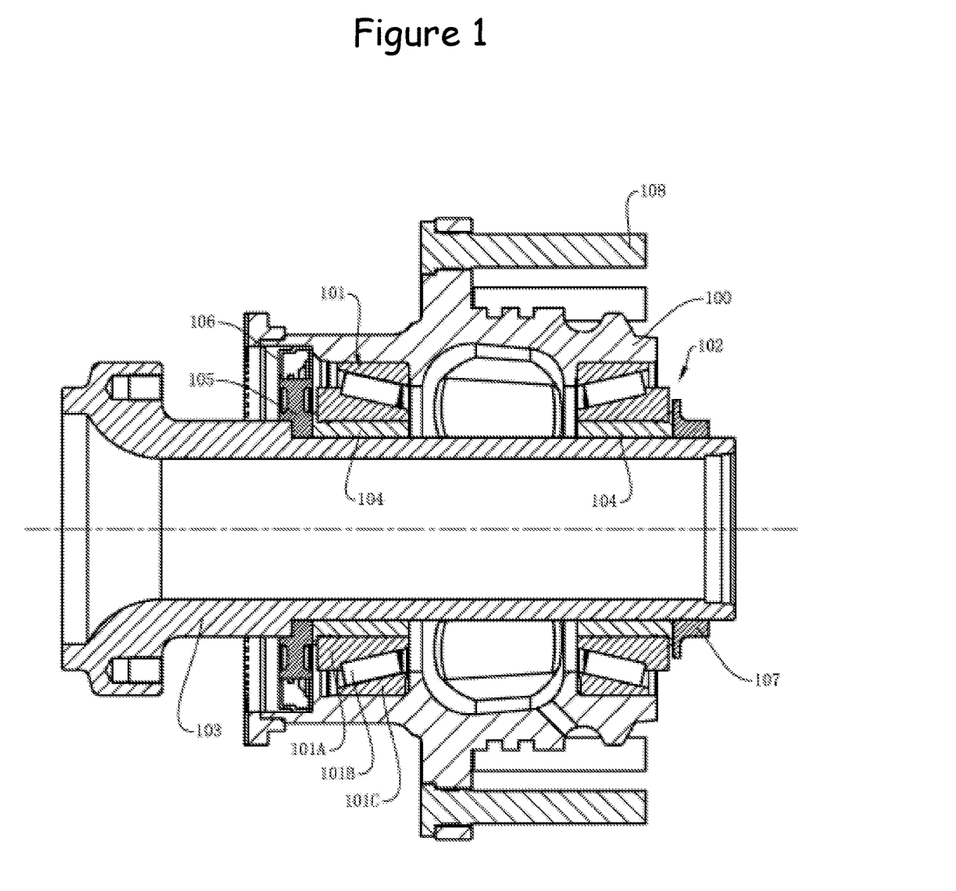
FIG. 1 is a section view of a structure according to a first embodiment of the present invention.

As shown in FIG. 1, a wheel hub unit, also called a wheel end assembly, is mainly applied to a commercial vehicle, and of course, can also be applied to a passenger car. The wheel hub unit comprises a wheel hub body 100 installed at an end part of a wheel axle 103, a first tapered roller bearing 101 and a second tapered roller bearing 102 are disposed in the wheel hub body 100, the first tapered roller bearing 101 comprises a bearing outer ring 101C, a bearing inner ring 101A and a rolling body 101B, the rolling body 101B is disposed between the bearing inner ring 101A and the bearing outer ring 101C, and the second tapered roller bearing 102 also comprises these components. The first tapered roller bearing 101 is disposed near a brake drum (not shown in the figure), the wheel hub body 100 is connected with a brake drum assembly by a bolt 108, the second tapered roller bearing 102 is disposed near a hub reduction gear assembly (not shown in the figure), an oil seal seat 105 is disposed between the first tapered roller bearing 101 and the wheel axle 103 and is located on an end part of an outer side of the first tapered roller bearing 101, and an oil seal 106 is sleeved on the oil seal seat 105, and the wheel axle 103 is provided with a spindle head nut 107 on one side of the second tapered roller bearing 102.

A bearing bush 104 is respectively disposed between the bearing inner rings of the first tapered roller bearing 101 and the wheel axle 103, and between the bearing inner rings of the second tapered roller bearing 102 and the wheel axle 103, the bearing bush 104 is in clearance fit with the bearing inner ring 101A and can rotate relative to the same, the bearing bush 104 is in close fit with the wheel axle 103, and considering that when a bearing clearance is adjusted (see FIG. 1), the bearing bush 104 requires slight axial movement, therefore, this close fit does not mean that the two components are fixed. The bearing outer ring 101C is assembled on the wheel hub body 100, and the bearing outer ring 101C and the wheel hub body 100 do not slide relative to each other under normal circumstances.

Figure 2:
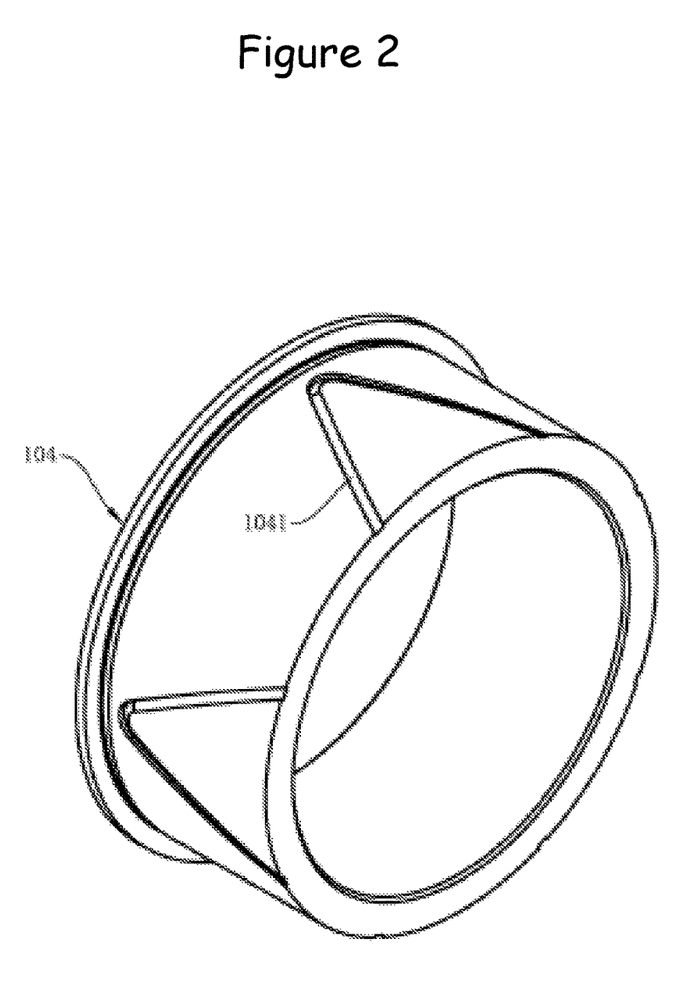
FIG. 2 is a schematic diagram of a structure of a bearing bush shown in FIG. 1.

As shown in FIG. 2, to reinforce the lubrication, an oil groove 1041 for storing oil is formed in an outer surface of the bearing bush 104, the oil groove 1041 is V-shaped, the opening of the V-shaped oil groove is formed in one end opposing to the shaft shoulder of the bearing bush 104, and four oil grooves 1041 are provided and distributed in an array. Of course, the shape and the number of the oil grooves 1041 are not limited thereto.

The brake drum and the hub reduction gear assembly are well known, so the specific structures thereof will not be described herein.

Second Embodiment

Figure 3:
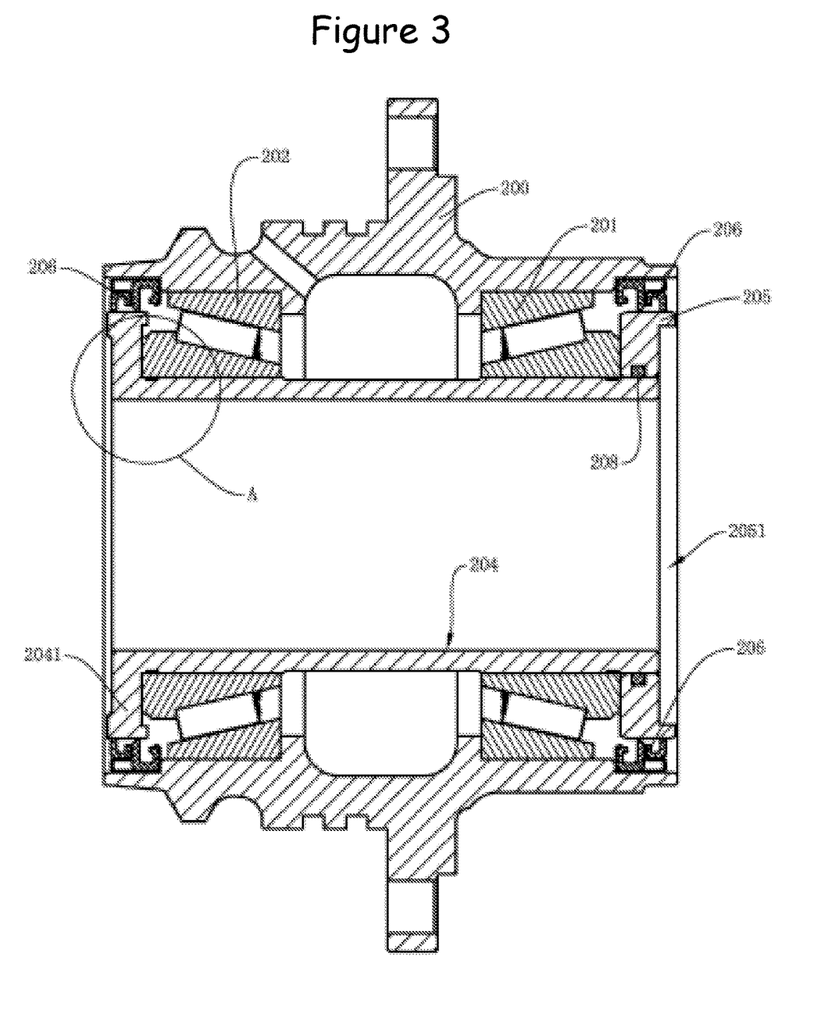
FIG. 3 is a section view of a structure according to a second embodiment of the present invention.
Figure 5:
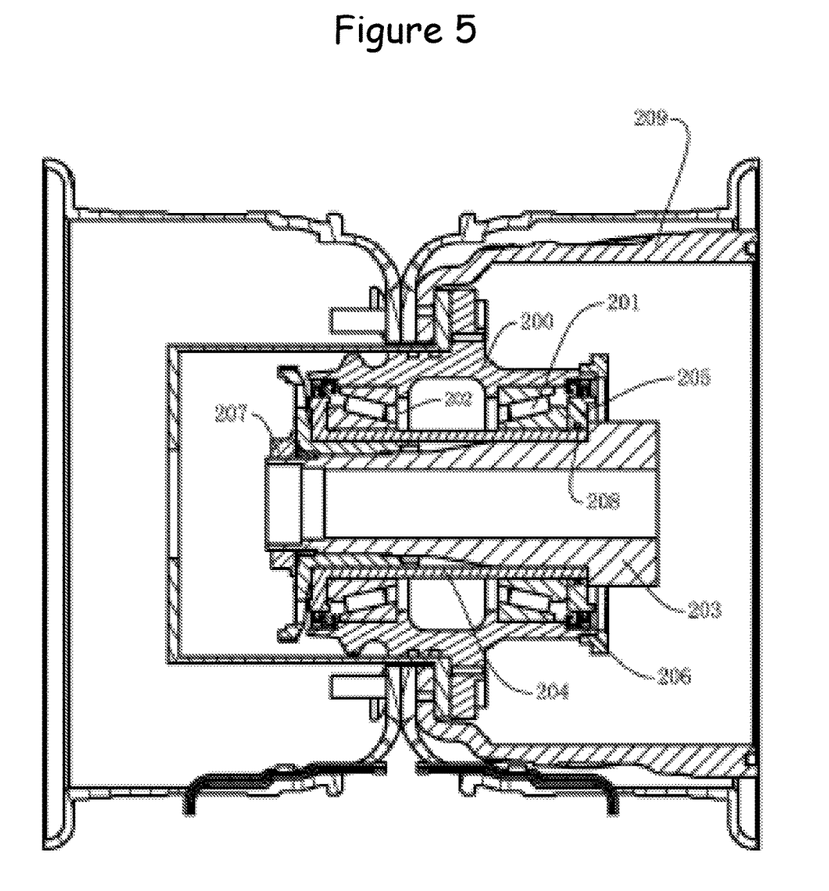

As jointly shown in FIG. 3 and FIG. 5, an integral wheel hub unit comprises a wheel hub body 200 connected with a brake drum 209, and a first tapered roller bearing 201 and a second tapered roller bearing 202 which are oppositely disposed are disposed in the wheel hub body 200. The two rolling bearings are sleeved on a shaft sleeve 204, and the shaft sleeve 204 is sleeved on a wheel axle 203.

Figure 4:
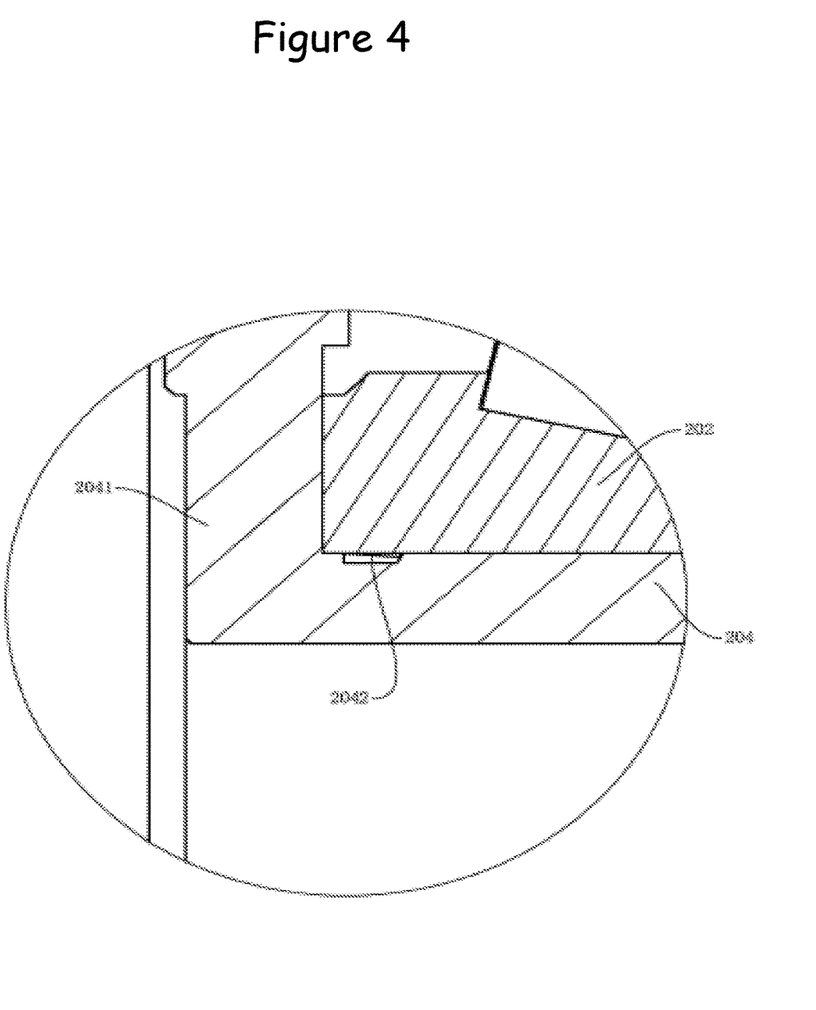
FIG. 4 is a partial enlarged view of part A shown in FIG. 3.

As shown in FIG. 4, a plurality of oil ducts 2042 are disposed on an outer peripheral surface of the shaft sleeve 204 to guarantee the lubrication performance between the outer peripheral surface of the shaft sleeve 204 and an inner peripheral surface of the inner ring of the rolling bearing, and the shape and the number of the oil ducts 2042 are not limited herein.

As jointly shown in FIG. 3 and FIG. 5, an annular convex ring 2041 is disposed at one end of the shaft sleeve 204, for the convenience of manufacture, the annular convex ring 2041 and the shaft sleeve 204 are designed integrally, and the annular convex ring 2041 leans against the inner ring of the second tapered roller bearing 202. A check ring 205 is sleeved on the other end of the shaft sleeve 204, and the check ring 205 leans against the inner ring of the first tapered roller bearing 201. One first seal element 206 is respectively disposed between the annular convex ring 2041 and the wheel hub body 200 and between the check ring 205 and the wheel hub body 200. The check ring 205 and the shaft sleeve 204 are in close fit, and considering that when a bearing clearance is adjusted (see FIG. 5), the check ring 205 requires slight axial movement, this close fit does not mean that the two components are fixed. To improve the sealing performance of a matching surface of the two components, a second seal element 208 is disposed between the check ring 205 and the shaft sleeve 204. Both of the first seal element 206 and the second seal element 208 are well known to those of ordinary skill in the art, such as sealing rings, oil seals, etc.

A groove 2051 is formed in the check ring 205, the groove 2051 is located at one end of the check ring 205 away from the first tapered roller bearing 201, and a spindle head nut 207 for adjusting the bearing clearance and providing a pre-tightening force is disposed on one side of the wheel axle 203 close to the annular convex ring 2041. It can be seen from FIG. 3 that an end face of the shaft sleeve 204 is flush with an installation end face of the check ring 205, and it can be seen from FIG. 5 that the shaft shoulder of the wheel axle 203 leans against the end faces of the check ring 205 and the shaft sleeve 204 at the same time. After the bearing clearance is adjusted according to the setting, an axial pre-tightening force provided by the spindle head nut 207 is transferred to both ends of the shaft sleeve 204 to avoid directly and consistently applying the axial pre-tightening force to the inner ring of the rolling bearing, thereby reducing the forced deformation of the raceway, and prolonging the service life of the rolling bearing.

The forgoing discussion disclosed and describes merely preferred embodiments of the present invention, and are in no way intended to limit the invention, and any modifications, equivalent substitutions and improvements can be made therein without departing from the spirit and scope of the invention.

INDUSTRIAL APPLICABILITY

1. A slide bearing (the shaft sleeve or the bearing bush) and the rolling bearing are used in combination, the bearing inner ring intermittently slides and rotates to ensure balanced stress (namely, the entire circumference participates in the stress) of an inner raceway under impact and vibration loads, so the friction resistance and the impact resistance of the inner raceway of the bearing are improved. The problem that the rolling body slides in the bearing inner ring to generate the high temperature to cause the fatigue pitting of the bearing inner ring is avoided, thereby prolonging the service life of the rolling bearing and improving the bearing capacity of the wheel hub unit.
2. Independent seal is realized, the assemblies can be integrally provided to the wheel hub unit supplier, compared with the separated parts, the problem that the bearing inner rings are exchanged and assembled in a mixed way during self assembly of the customers is avoided, both the assembly efficiency and the assembly precision are improved, and great convenience is brought to the wheel hub unit supplier.
3. After the bearing clearance is adjusted according to the setting, the axial pre-tightening force provided by the spindle head nut is transferred to both ends of the shaft sleeve to avoid directly and consistently applying the axial pre-tightening force to the inner ring of the rolling bearing, thereby reducing the stress deformation of the raceway and prolonging the service life of the rolling bearing.

The invention claimed is:

1. A wheel hub unit for a commercial vehicle, comprising:
a wheel hub body;
a first tapered roller bearing and a second tapered roller bearing, wherein the first tapered roller bearing and the second tapered roller bearing are oppositely disposed in the wheel hub body, wherein an oil seal seat is disposed on an end part of an outer side of the first tapered roller bearing, and wherein an oil seal is disposed between the oil seal seat and the wheel hub body; and
two bearing bushes, wherein inner rings of the first tapered roller bearing and the second tapered roller bearing are respectively sleeved on one bearing bush.

2. The wheel hub unit of claim 1, wherein an oil groove for storing oil is formed in an outer peripheral surface of the bearing bush.

3. An integral wheel hub unit, comprising:
a wheel hub body;
a first tapered roller bearing and a second tapered roller bearing, wherein the first tapered roller bearing and the second tapered roller bearing are oppositely disposed in the wheel hub body, wherein a check ring is disposed on an end part of an outer side of the first tapered roller bearing, and wherein a first seal element is disposed between the check ring and the wheel hub body; and a shaft sleeve, wherein inner rings of the first tapered roller bearing and the second tapered roller bearing are sleeved on the shaft sleeve, an annular convex ring is disposed at one end of the shaft sleeve, a first seal element is disposed between the annular convex ring and the wheel hub body, and the check ring is sleeved on the other end of the shaft sleeve.

4. The wheel hub unit of claim 3, wherein an oil duct for storing oil is formed in an outer peripheral surface of the shaft sleeve.

5. The wheel hub unit of claim 4, wherein a second seal element is disposed between an outer peripheral surface of the shaft sleeve and an inner peripheral surface of the check ring.

6. The wheel hub unit of claim 5, wherein the annular convex ring leans against the inner ring of the second tapered roller bearing, the check ring leans against the inner ring of the first tapered roller bearing, and an end face of the shaft sleeve located on one side of the check ring is flush with an installation end face on an outer side of the check ring.

7. The wheel hub unit of claim 4, wherein the annular convex ring leans against the inner ring of the second tapered roller bearing, the check ring leans against the inner ring of the first tapered roller bearing, and an end face of the shaft sleeve located on one side of the check ring is flush with an installation end face on an outer side of the check ring.

8. The wheel hub unit of claim 3, wherein the annular convex ring leans against the inner ring of the second tapered roller bearing, the check ring leans against the inner ring of the first tapered roller bearing, and an end face of the shaft sleeve located on one side of the check ring is flush with an installation end face on an outer side of the check ring.

9. The wheel hub unit of claim 8, wherein the annular convex ring and the shaft sleeve are integrally disposed.

* * * * *